Nov. 10, 1942.  J. W. BAIRD  2,301,357
VEHICLE SPRING
Filed Dec. 19, 1940
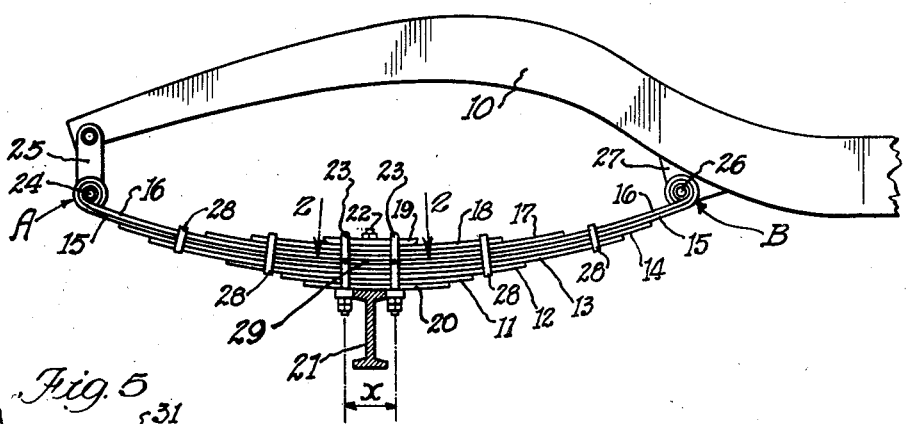
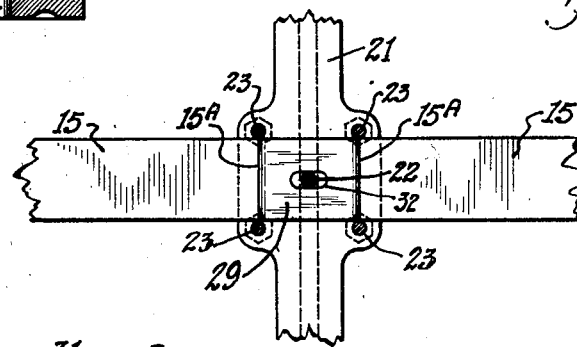
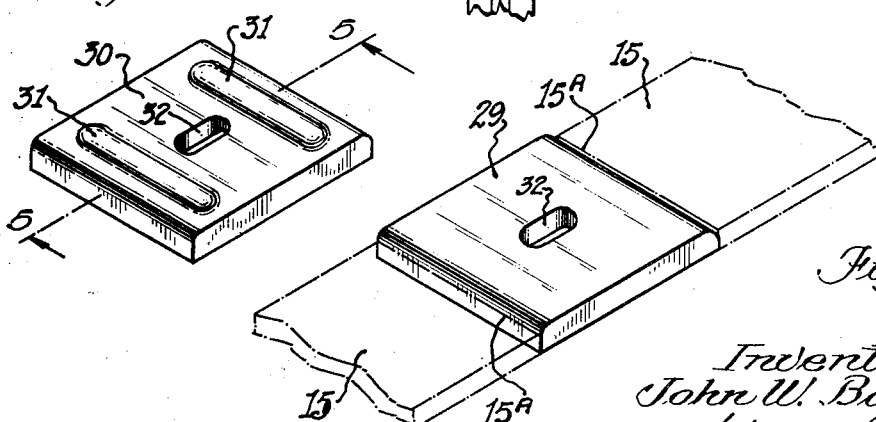
Inventor:
John W. Baird
By: Frank Schraeder Jr.
Attorney

Patented Nov. 10, 1942

2,301,357

UNITED STATES PATENT OFFICE 2,301,357

VEHICLE SPRING

John W. Baird, Glen Ellyn, Ill.

Application December 19, 1940, Serial No. 370,857

8 Claims. (Cl. 267—47)

The invention relates generally to new and useful improvements in vehicle springs and has particular reference to a novel automobile spring assembly.

One of the important objects of my invention resides in the provision of a simple and novel vehicle spring assembly of the semi-elliptical type, composed of a plurality of superposed spring leaves, wherein one, of a pair of the spring leaves having rolled concentric ends, is divided to provide spaced-apart inner ends, and between which ends is disposed a separate resistor plate adapted to engage such spaced-apart spring ends at spaced vertical planes disposed substantially in alignment with the vertical center lines of two laterally spaced clamps embracing the medial portion of the spring assembly at its central or intermediate support.

Another novel feature of my invention is found in the provision of an automobile semi-elliptical spring assembly composed of a plurality of superposed spring leaves wherein one, of a pair of the spring leaves having tightly rolled concentric ends, is divided to provide spaced-apart inner ends which are in abutment with a separate resistor plate of a thickness which is slightly greater than the thickness of the divided spring leaf whereby the end portions of the spaced-apart ends of the divided spring leaf are free for movement and are not subjected to undue pressure of the two usual spaced clamps which are disposed in the vertical planes of such spaced-apart spring ends and which secure such spring assembly to the automobile axle; said arrangement providing a fulcrum action after spring is flexed, for the divided spring ends at fulcrum points disposed at the vertical planes of the two spaced clamps which secure the spring assembly to the automobile axle, and said divided spring and resistor plate resisting the flexing of the spring assembly in one direction whereby spring assemblies of this type may be made of lighter weight and fewer number of spring leaves to provide the desired retardation of vibrating action with comparative quick resilient absorption of imposed shocks.

Another novel feature of my invention resides in the provision of the above-described resistor plate of the same thickness as its cooperative divided spring leaf, but which resistor plate is provided with spaced portions, preferably spaced surface portions, which are slightly offset or raised relatively to the adjacent portion or surface of the resistor plate to permit free relative movement of the spaced-apart ends of the divided spring leaf.

With the above and other objects in view, my invention consists in the novel combination, construction and arrangement of the parts and members shown in preferred embodiment in the attached drawing, described in the following specifications and particularly pointed out in the appended claims.

In the drawing:

Fig. 1 is a side elevation of a semi-elliptical automobile spring assembly embodying my invention;

Fig. 2 is an enlarged section of the central portion of the spring assembly, taken on line 2—2 of Fig. 1 and showing the resistor plate and the inner end portions of the divided spring leaf in abutment therewith;

Fig. 3 is a still further enlarged, but isometric, view of the resistor plate and the inner end portions of the divided spring leaf;

Fig. 4 is an isometric view of a modified form of resistor plate; and

Fig. 5 is a longitudinal section taken on line 5—5 of Fig. 4.

The spring assembly is shown in the drawing as in its normal position mounted at one end of an automobile frame 10. The assembly consists of a plurality of superposed normally arcuate spring leaves of different lengths indicated by numerals 11, 12, 13, 14, 15, 16, 17 and 18, positioned between the top and bottom plates indicated respectively by numerals 19 and 20.

The assembly is supported on the axle 21 and rigidly secured thereto by the bolt 22 and the spaced U-shaped clamps 23.

The main supporting spring leaves 15 and 16, which are the longest spring leaves in such assembly, are provided at both ends A and B with rolled concentric ends. The rolled end A is supported on pin 24 carried in the lower end of the shackle 25 which is pivotally supported on one end of the frame 10.

The rolled end B is supported on pin 26 carried in the bracket 27.

Clamping clips 28 retain the spring leaves against relative transverse displacement.

My invention resides in dividing one of the two longest spring leaves 15 and 16, preferably the lower one 15, whose ends are rolled around the outside of the rolled ends of the upper one indicated by numeral 16.

In dividing such spring leaf 15, a medial portion of same is cut away to provide such divided spring leaf with spaced-apart ends, indicated by 15ᴬ.

A resistor plate 29 is interposed between the spaced-apart ends 15ᴬ and the thickness of the resistor plate 29 is slightly greater than the thickness of the divided spring leaf 15. The thickness of the resistor plate 29 may, for example, be .015 to .020 of an inch more than that of the spring leaf 15 to prevent clamping engagement of the inner end portions 15ᴬ by the U-shaped clamps 23.

I have found that the assembled and installed length of the chord of the arcuate resistor plate 29 should not preferably exceed the lateral distance X between the vertical center-lines of the U-shaped clamps 23.

In the fabrication of my improved spring, the length of the portion of the spring leaf which is cut and removed therefrom must be longer than the length of the resistor plate 29 so that when all of the spring elements are assembled in the shop into the completed spring assembly, before installation on the vehicle, there must be a predetermined space between each end of the resistor plate 29 and the end 15A of the divided spring leaf 15.

The relative length of the resistor plate 29 to the distance between the spaced ends 15A of the spring leaf 15 will vary with the normal weight of the automobile and the design, resiliency, and resistance desired in the spring assemblies; however, I have found that these spaces between the ends of the resistor plate 29 and the spring ends 15A, in the shop-assembled spring unit, must be of such width that, when the spring assemblies are installed in the automobile, the ends 15A of the spring leaf 15 will preferably contact or abut with the ends of the resistor plate 29 with a minimum of pressure. In other words, the spaces between the spring ends 15A and the resistor plate 29 will be closed when the normal free arch opening between rolled ends A and B is lengthened in the installed position with the weight of the automobile imposed upon the spring assemblies.

In their installed positions, the inner ends 15A of the divided spring leaves 15 of the spring assemblies will act to impose a resistance to upward movements of the medial portions of the spring assemblies by the abutment of the inner spaced ends 15A of the divided spring leaves with the resistor plates, and also against the other half of the spring leaf.

Due to the slightly increased thickness of the resistor plates, the spring leaf ends 15A will be free to move slightly outwardly and inwardly as well as slightly up and down at such ends during the flexing movements of the spring assemblies to thereby not only resist movements tending to increase the length of the arch openings, but will also provide the desired fulcrum actions at the ends of the divided spring leaves.

It is not necessary to use resistor plates which are thicker, throughout their entire cross-section, than the thickness of the divided spring leaves; the same advantages can be secured by using resistor plates which are of a thickness equal to the thickness of the divided spring leaves and mechanically upset at spaced portions of one face thereof, as illustrated in Figs. 4 and 5.

The modified resistor plate 30 shown in Figs. 4 and 5 may be mechanically upset, as at 31, to slightly increase its operatively effective thickness.

Both types of resistor plates 29 and 30 are preferably provided with an elongated opening 32 for the bolt 22.

I claim:

1. A vehicle semi-elliptical spring assembly comprising a plurality of superposed normally arcuate spring leaves, two of said leaves being formed with concentrically rolled ends at both ends of said two leaves, one of said two leaves being divided to provide spaced apart inner ends, a resistor for resisting the flexing of the spring assembly in one direction comprising a plate interposed between said spaced apart leaf ends, said resistor plate being of a thickness slightly greater than the thickness of said divided spring leaf and the length of said resistor plate being such that when the vehicle is in stationary position the ends of such resistor plate are in very slight pressure-contact with the said spaced apart ends of said divided spring leaf.

2. A vehicle semi-elliptical spring assembly comprising a plurality of superposed normally arcuate spring leaves, the longest two of said leaves being formed with concentrically rolled ends at both ends of said two leaves, the lower one of said two leaves being divided to provide spaced apart inner ends, a resistor for resisting the flexing of the spring assembly in one direction comprising a plate interposed between said spaced apart leaf ends, said resistor plate being of a thickness slightly greater than the thickness of said divided spring leaf and the length of such resistor plate being such that when the vehicle is in stationary position the ends of such resistor plate are in very slight pressure-contact with the said spaced apart ends of said divided spring leaf.

3. A vehicle spring assembly as defined in claim 1, and including a pair of spaced clamps embracing the central portion of the spring assembly, and said spaced apart ends of said divided spring leaf being disposed substantially within the vertical plane of said spaced clamps.

4. A vehicle spring assembly as defined in claim 2, and including a pair of substantially vertically disposed spaced clamps embracing the central portion of the spring assembly, and said spaced apart ends of said divided spring leaf being disposed at substantially the vertical center-lines of said clamps.

5. In a semi-elliptical vehicle spring assembly, a plurality of superposed spring leaves, one of said spring leaves being divided to provide spaced apart inner ends substantially within the central portion of the spring assembly, and a resistor plate in abutment with said spaced apart ends when the vehicle is in stationary position, said resistor plate having an upper contact surface which is disposed slightly above the upper faces of the divided spring leaf.

6. In a semi-elliptical vehicle spring assembly as embodied in claim 5, wherein said resistor plate is, in normal stationary position of the vehicle, in comparatively slight pressure contact with said spaced apart ends.

7. In a semi-elliptical vehicle spring assembly as embodied in claim 5 wherein said upper contact surface of said resistor plate comprises a raised portion on the upper face of said resistor plate, whereby the face of an adjacent spring leaf is spaced from the face of the resistor.

8. In a vehicle spring assembly, a plurality of superposed spring leaves, an intermediate one of said spring leaves being divided to provide spaced apart inner ends, and a resistor plate normally in abutment with said spaced apart spring leaf ends, said resistor plate having upset portions provide contact surfaces which are disposed slightly beyond the adjacent surface of the resistor plate, whereby the face of an adjacent spring leaf is spaced from the face of the resistor.

JOHN W. BAIRD.